(12) United States Patent
Kurosawa

(10) Patent No.: US 7,471,891 B2
(45) Date of Patent: Dec. 30, 2008

(54) SINGLE-LENS-REFLEX DIGITAL CAMERA

(75) Inventor: Yuichi Kurosawa, Tokyo (JP)

(73) Assignee: Hoya Corporation, Tokyo (JP)

( * ) Notice: Subject to any disclaimer, the term of this patent is extended or adjusted under 35 U.S.C. 154(b) by 331 days.

(21) Appl. No.: 11/459,438

(22) Filed: Jul. 24, 2006

(65) Prior Publication Data
US 2007/0019945 A1 Jan. 25, 2007

(30) Foreign Application Priority Data
Jul. 25, 2005 (JP) ............................. 2005-214993

(51) Int. Cl.
G03B 17/20 (2006.01)
G03B 19/12 (2006.01)
H04N 5/222 (2006.01)

(52) U.S. Cl. ........................ 396/296; 396/354; 396/374; 348/333.09

(58) Field of Classification Search ................. 396/296, 396/358, 359, 373, 374; 348/333.01, 333.02, 348/333.09
See application file for complete search history.

(56) References Cited

U.S. PATENT DOCUMENTS 6,249,650 B1 6/2001 Iwamoto
6,314,246 B1 11/2001 Ozaki et al.
6,980,247 B1 12/2005 Kodama et al.
2005/0168612 A1* 8/2005 Koppetz ................. 348/333.09

FOREIGN PATENT DOCUMENTS

JP 10-294888 11/1998
JP 2000-137268 5/2000

OTHER PUBLICATIONS

English Language Abstract of JP 2000-137268.

* cited by examiner

Primary Examiner—W. B. Perkey
Assistant Examiner—Minh Phan
(74) Attorney, Agent, or Firm—Greenblum & Bernstein, P.L.C.

(57) ABSTRACT

A single-lens-reflex digital camera in which an optical image of an object that is to be photographed via a photographing lens is reflected by a main mirror to be formed on a focusing screen so that the optical image is viewed through a viewfinder while the main mirror is retracted from an optical path of the photographing lens to capture an image of the object by an image pickup device, the single-lens-reflex digital camera includes an electroluminescent display provided on the focusing screen, wherein the electroluminescent display displays at least the object image captured by the image pickup device. The single-lens-reflex digital camera is configured to allow the object image displayed by the electroluminescent display and the optical image formed on the focusing screen to be viewed through the viewfinder.

10 Claims, 16 Drawing Sheets

SINGLE-LENS-REFLEX DIGITAL CAMERA

BACKGROUND OF THE INVENTION

1. Field of the Invention

The present invention relates to a single-lens-reflex digital camera, more specifically to a single-lens-reflex digital camera which is designed and configured to allow the photographer to see an optical image and a live digital image of an object to be photographed, so as to be selectively viewed through a viewfinder.

2. Description of the Prior Art

Typical SLR (single-lens-reflex) digital cameras are provided with a main mirror (quick-return mirror) positioned on an optical axis of a photographing lens so that light of an object which is passed through the photographing lens is reflected by the main mirror to be formed on a focusing screen as an optical image of the object. This optical image formed on the focusing screen is viewed through a viewfinder (viewfinder optical system). When the main mirror has been retracted from an optical path of the photographing lens, i.e., when the main mirror has risen, the light of an object which is passed through the photographing lens is formed on an image pickup device while an image signal of the object is visually indicated on an external LCD (liquid crystal display) monitor, or the like, to be viewed as a live digital image. Accordingly, in this type of digital camera, if the photographer desires to continue observing an object to be photographed through the digital camera, they have only two ways of viewing: they observe either an optical image of the object through the viewfinder or a live digital image of the object which is displayed on the external LCD monitor when the main mirror rises.

In view of this type of digital camera, a technology that installs a small LCD monitor in a viewfinder optical system to enable the photographer to observe a live digital image of an object, which is taken by an image pickup device and displayed on an external LCD monitor, through the viewfinder has been proposed in Japanese unexamined patent publication H10-294888 (hereinafter referred to as a first publication). According to this technology, the photographer can selectively observe the optical image and the live digital image through the viewfinder, which is effective for enhancing the convenience of the digital camera at a time of exposure.

In SLR digital cameras, to enable the photographer to view an optical image of an object and various information (e.g., an f-number and a shutter speed) at the same time, the viewfinder is provided therein with a display device for making the various information display on the focusing screen as visual information. An LCD is used as such a display device. Visual information displayed on the LCD is formed either on the focusing screen or at a position on an optical axis which is optically equivalent to the position of the focusing screen by an optical device. In Japanese unexamined patent publication 2000-137268 (hereinafter referred to as a second publication), a device for displaying a required image on the focusing screen using an EL (electroluminescent) display instead of such a type of LCD has been proposed. Specifically, forming an EL display in a peripheral part of the object image forming area (picture area) of the focusing screen and making the EL display indicate various information by making an EL drive circuit drive the EL display makes it possible to display the various information on the focusing screen together with an optical image of an object so that the photographer can view the various information and the optical image of the object at the same time through the viewfinder. Additionally, in the second publication, an arrangement wherein an EL display is formed on a surface of a prism serving as an element of a viewfinder optical system has also been proposed.

In the first publication, to allow the photographer to selectively view an optical image and a live digital image of an object, a movable mirror or the like which is installed in a part of a viewfinder optical system is driven to switch between two optical paths, and accordingly, the digital camera has to be provided with a drive mechanism for switching between the two optical paths, which complicates the structure of the viewfinder. Additionally, there is a problem of the viewfinder becoming large because an LCD monitor (internal LCD monitor) is installed in the viewfinder. Additionally, in the second publication, although the EL display mounted to the focusing screen can be made thinner than an LCD, this EL display displays only visual information, and accordingly, an image to be displayed on the focusing screen is limited solely to an optical image which is formed on the focusing screen via a photographing lens. On this account, to visually check the live digital image, the photographer has no other choice but to visually check the live digital image displayed on the external LCD monitor installed in the viewfinder, so that the viewfinder only has a capability similar to the viewfinder of a conventional SLR camera in the second publication.

SUMMARY OF THE INVENTION

The present invention provides an SLR camera which is designed and configured to allow a live digital image to be viewed through a viewfinder without employing a complicated structure and without requiring a complicated control for switching between an optical image and a live digital image.

According to an aspect of the present invention, a single-lens-reflex digital camera is provided, in which an optical image of an object that is to be photographed via a photographing lens is reflected by a main mirror to be formed on a focusing screen so that the optical image is viewed through a viewfinder while the main mirror is retracted from an optical path of the photographing lens to capture an image of the object by an image pickup device. The single-lens-reflex digital camera includes an electroluminescent display provided on the focusing screen, wherein the electroluminescent display displays at least the object image captured by the image pickup device, and the single-lens-reflex digital camera is configured to allow the object image displayed by the electroluminescent display and the optical image formed on the focusing screen to be viewed through the viewfinder.

It is desirable for the electroluminescent display to be formed integrally with the focusing screen.

It is desirable for the electroluminescent display to display the object image captured by the image pickup device and various information, when the main mirror is retracted from the optical path of the photographing lens, and for the electroluminescent display to only display the various information when the main mirror lies on the optical path of the photographing lens.

It is desirable for the single-lens-reflex digital camera to include a light shield screen which selectively covers and uncovers a surface of the focusing screen which is adjacent to the main mirror.

It is desirable for the single-lens-reflex digital camera to include a mirror drive mechanism which drives the main mirror, and a light shield screen drive mechanism which retracts the light shield screen from a position thereof which covers the surface of the focusing screen. The mirror drive mechanism and the light shield screen drive mechanism are integrated with each other.

It is desirable for the main mirror to be retracted from the optical path of the photographing lens in the case where the photographing lens has an image stabilizing capability.

It is desirable for the single-lens-reflex digital camera to be configured to allow the object image displayed by the electroluminescent display and the optical image formed on the focusing screen to be selectively viewed through the viewfinder.

It is desirable for the electroluminescent display to be positioned on one side of the focusing screen from the main mirror.

It is desirable for the single-lens-reflex digital camera to include a light shield screen which is selectively inserted into and retracted from a space between the focusing screen and the main mirror when the main mirror is in a retracted position in which the main mirror is positioned out of the optical path of the photographing lens.

In an embodiment, a single-lens-reflex digital camera is provided, including a quick-return mirror; a focusing screen, positioned above the quick-return mirror, wherein light of an object which is passed through a photographing optical system and reflected by the quick-return mirror to be formed as an optical image on the focusing screen is viewed through a viewfinder optical system, and wherein, upon a shutter release, the quick-return mirror is retracted from an optical path of the photographing lens to allow the object light that is passed through the photographing optical system to be incident on an image pickup device so that the image pickup device picks up a digital image of the object; and an electroluminescent display which displays the digital image on the focusing screen at least when the quick-return mirror is retracted from the optical path.

According to the present invention, since the focusing screen is provided with an EL display that can be formed thin, and since an object image picked up by an image pickup device is also displayed on the focusing screen by the EL display, an optical image of an object formed on the focusing screen and a live digital image of the same object displayed by the EL display can be selectively viewed through the viewfinder. According to this structure, the photographer can take a picture of an object while viewing a live digital image of the object through the viewfinder in an SLR digital camera while the viewfinder does not have to be provided with any switching mechanism such as that taught in the first publication for switching between the optical image and the live digital image, which facilitates the image switching operation and prevents the structure of the camera from becoming complicated.

Moreover, the digital image displayed by the EL display does not become difficult to view due to reflections of the main mirror due to placing a light shielding screen below the focusing screen. Furthermore, in the case where the photographing lens is a type which incorporates an image-stabilizing optical element such as an image-stabilizing lens element, the photographer can be prevented from getting finder-view motion sickness by viewing a live digital image displayed by the EL display.

The present disclosure relates to subject matter contained in Japanese Patent Application No. 2005-214993 (filed on Jul. 25, 2005) which is expressly incorporated herein in its entirety.

BRIEF DESCRIPTION OF THE DRAWINGS

The present invention will be discussed below in detail with reference to the accompanying drawings, in which:

FIGS. 15A and 15B show a flow chart showing operations of an EL display indicating process performed in the SLR digital camera shown in FIGS. 1 and 2.

DESCRIPTION OF THE PREFERRED EMBODIMENT

Figure 1:
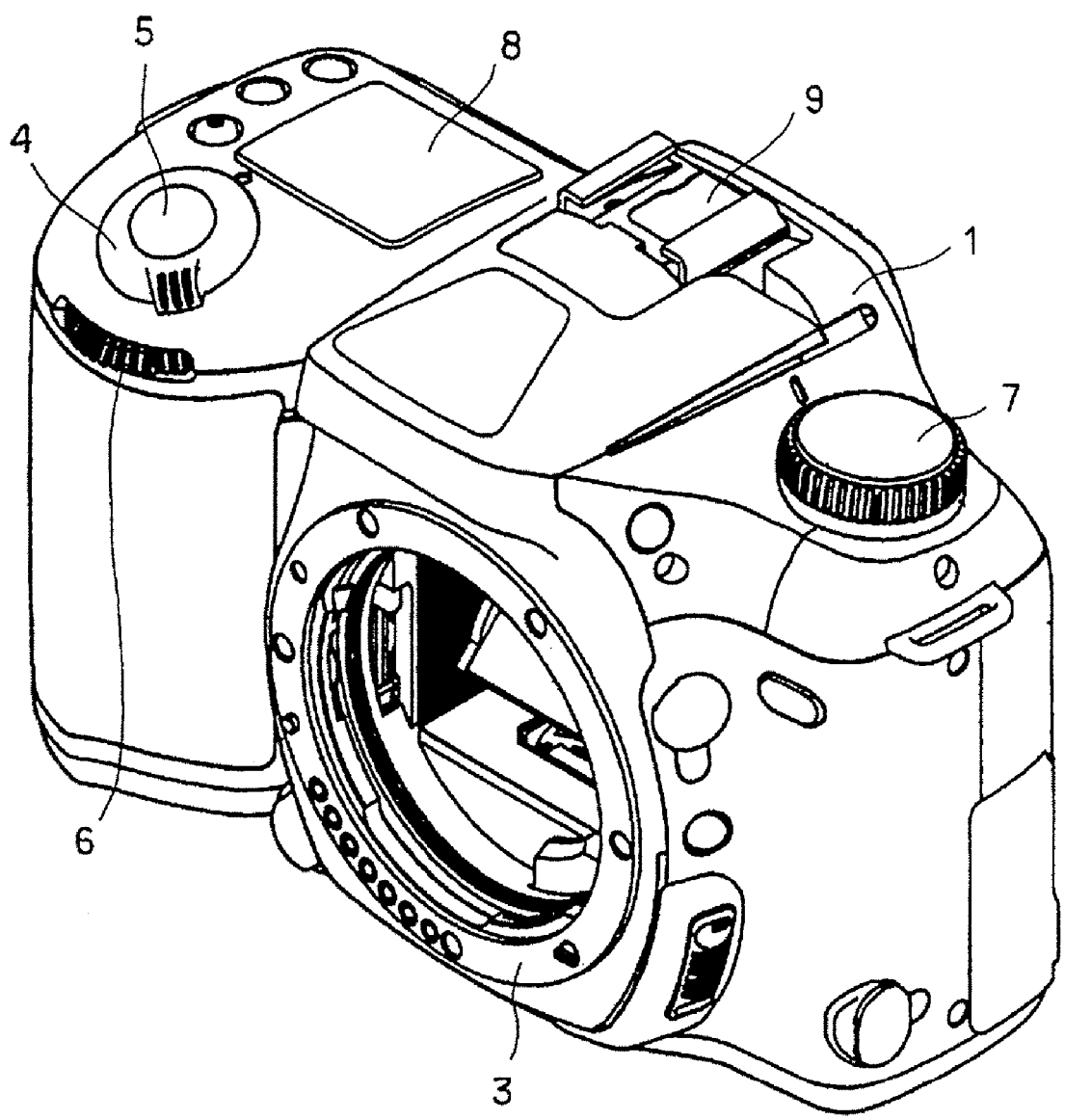
FIG. 1 is a front perspective view of an SLR digital camera according to the present invention.
Figure 2:
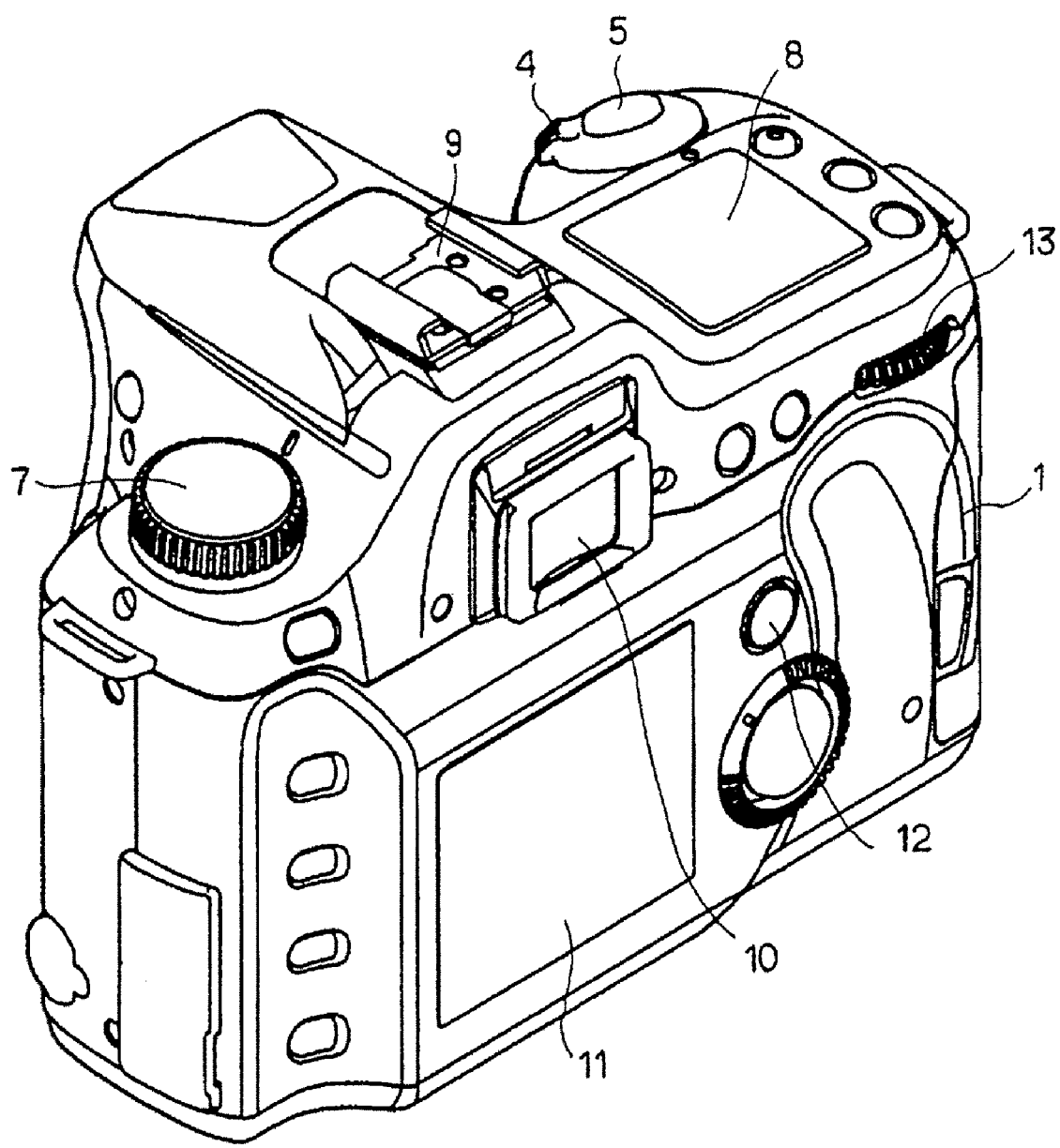
FIG. 2 is a rear perspective view of the SLR digital camera shown in FIG. 1.

The embodiment of the SLR digital camera shown in FIGS. 1 and 2 is provided with a camera body 1 and an interchangeable photographing lens 2 (see FIG. 13) detachably attached to the camera body 1. The photographing lens 2 is not shown in FIGS. 1 and 2. The camera body 1 is provided on the front thereof with a lens mount (mount ring) 3 to which the photographing lens 2 is detachably attached, and is further provided on the top of the camera body 1 with a main switch 4, a shutter release button 5, a front select dial 6, a mode select dial 7, an information-indicating LCD panel 8 and an accessory shoe (hot shoe) 9. The camera body 1 is provided on the back thereof with a viewfinder window 10, an external LCD monitor 11, an EL display ON/OFF button 12 and a rear select dial 13.

Figure 3:
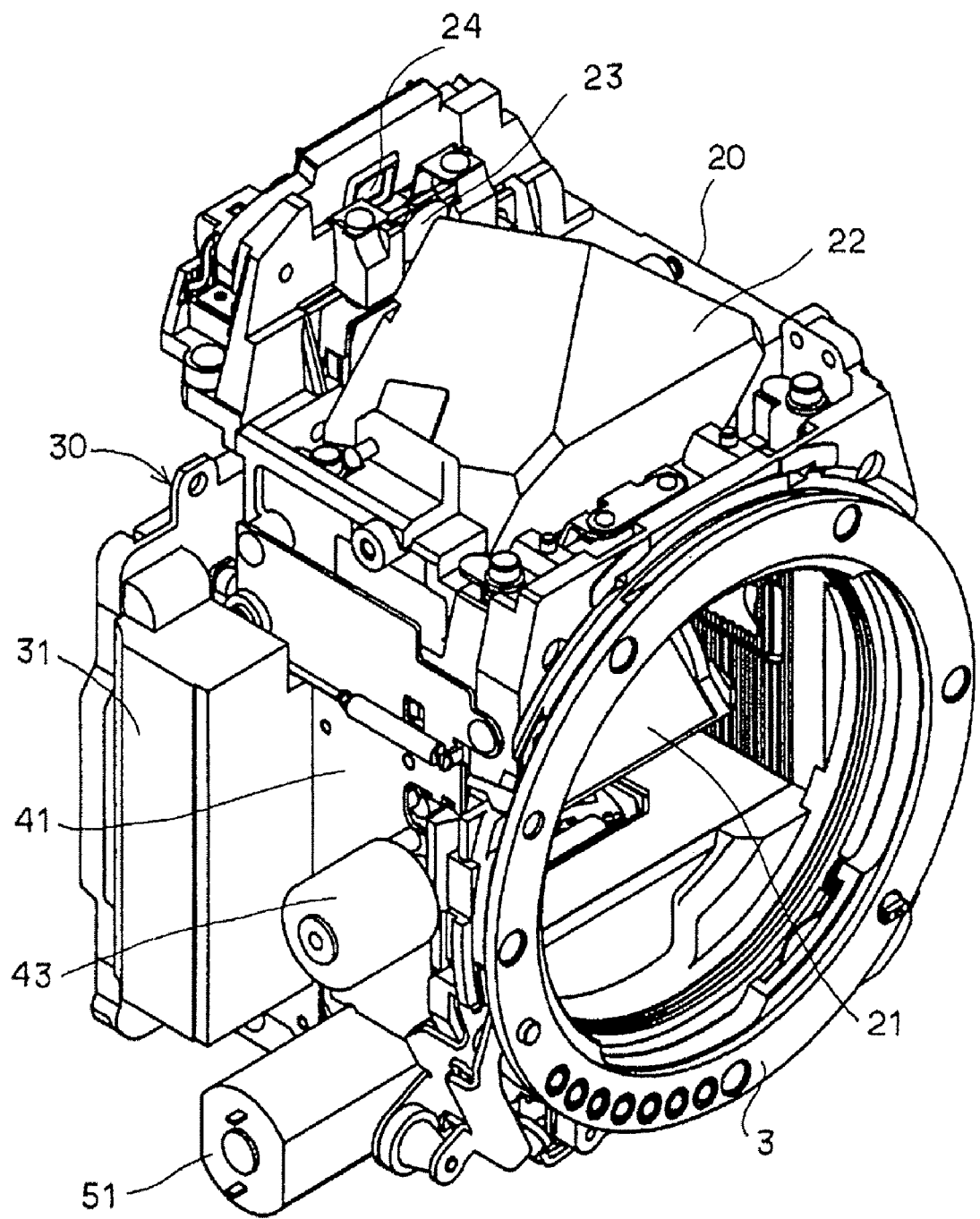
FIG. 3 is a front perspective view of a mirror box and associated components mounted to the mirror box in the camera body shown in FIGS. 1 and 2.
Figure 4:
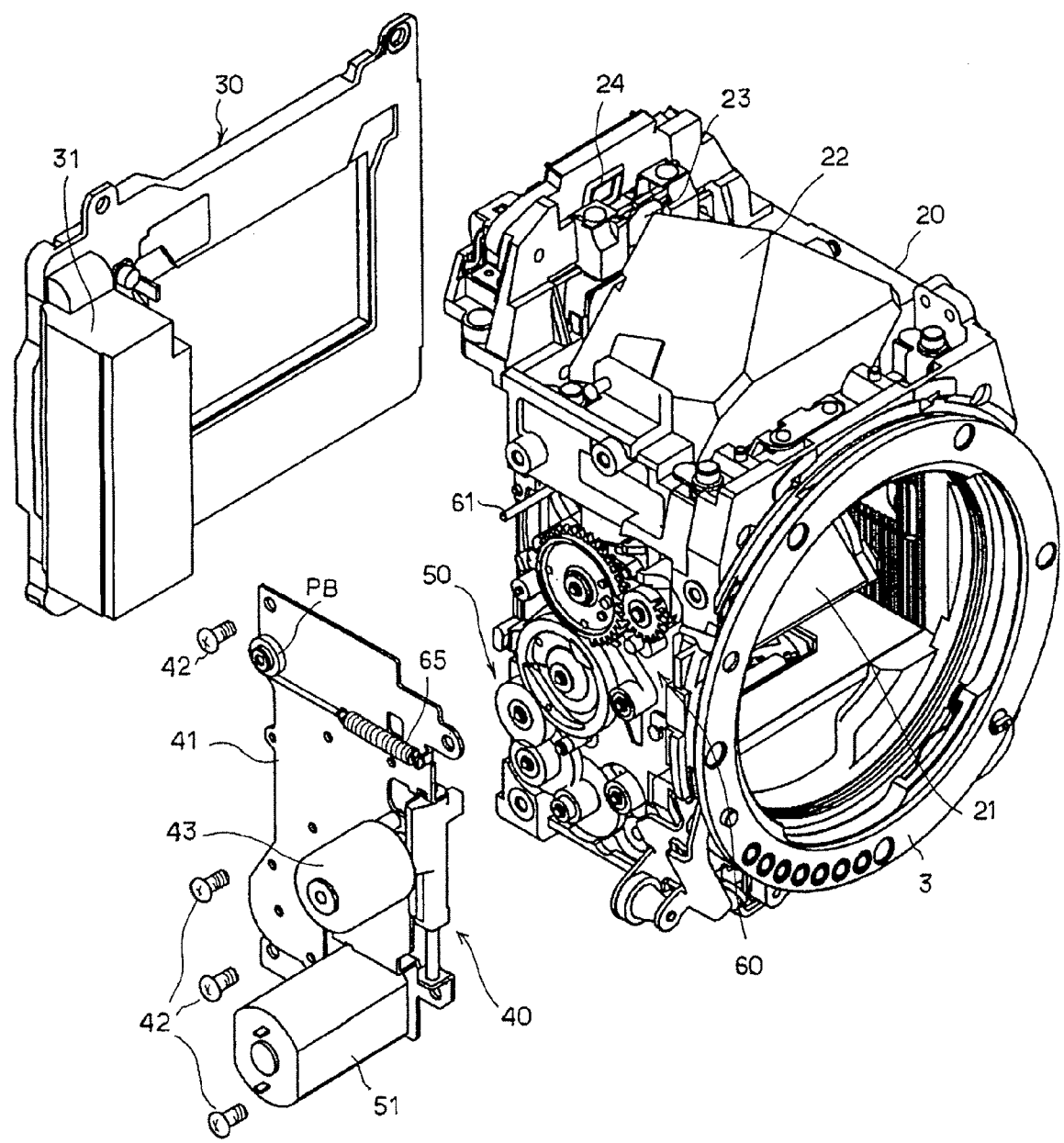
FIG. 4 is an exploded perspective view of the mirror box and the associated components that are shown in FIG. 3.

FIG. 3 is a front perspective view of a mirror box 20 and associated components mounted to the mirror box 20 that are provided in the camera body 1, and FIG. 4 is an exploded perspective view of the mirror box 20 and the associated components. The mirror box 20 is provided therein with a main mirror (quick-return mirror) 21 which is pivoted about a horizontally-extending mirror shaft 21b to be swingable horizontally. The main mirror 21 is in a lower position (shown in FIGS. 5 and 6) in which the main mirror 21 lies on the optical axis of the photographing lens 2 at the angle of approximately 45 degrees in a normal state. In this state, the main mirror 21 reflects the incident light, which is passed through the photographing lens 2 and incident on the main mirror 21, upward to be formed on a focusing screen 25 shown in FIGS. 5 and 6 (not shown in FIGS. 3 and 4). When the main mirror 21 rotates so as to rise, the main mirror 21 is positioned in an upper position (retracted position shown in FIGS. 8 and 9) in which the main mirror 21 has fully retracted from an optical path of the photographing lens 2, in which an object light passes, to allow this object light to be incident on an image pickup device 14 (see FIG. 13; not shown in FIGS. 3 and 4) behind the mirror box 20 to be formed as an object image on the image pickup device 14 so that the image pickup device 14 photoelectrically converts the object light into an image signal to output this image signal. The image pickup device 14 can be composed of a CCD.

The focusing screen 25 is installed in the mirror box 20 in an upper space thereof, and a pentagonal prism 22 for changing an object image formed on the focusing screen 25 to an erect image is installed in the mirror box 20 immediately above the focusing screen 25. The camera body 1 is provided behind the pentagonal prism 22 with a photometering lens 23 (see FIGS. 3 and 4), a photometering element 24 and an eyepiece 28 (see FIG. 13). The camera body 1 is provided between the mirror box 20 and the aforementioned image pickup device 14 with a shutter unit 30. The shutter unit 30 is provided with a shutter drive mechanism 31 which drives a focal plane shutter provided in the shutter unit 30 so that the focal plane shutter opens and shut, which allows a photographing operation to occur at the image pickup device 14. The camera body 1 is provided on the left side (as viewed from the front of the camera body 1; this side is hereinafter referred to as the left side) of the mirror box 20 with a diaphragm drive mechanism 40 for actuating an iris diaphragm 201 (see FIG. 13) provided in the photographing lens 2 and a mirror drive mechanism 50 for swinging the main mirror 21 vertically.

A diaphragm drive mechanism support plate 41 is fixed to the left side of the mirror box 20 by set screws 42. The diaphragm drive mechanism 40 is provided with a diaphragm drive motor 43 serving as a drive source for driving the diaphragm drive mechanism 40, and the mirror drive mechanism 50 is provided with a mirror drive motor 51 serving as a drive source for driving the mirror drive mechanism 50. The diaphragm drive motor 43 and the mirror drive motor 51 are supported by the diaphragm drive mechanism support plate 41. The diaphragm drive mechanism 40 is mechanically linked with a stop-down lever (not shown) of the photographing lens 2 attached to the lens mount 3 to make the diaphragm 201 operate by a rotating action of the diaphragm drive motor 43. This linkage mechanism is similar in structure to those of conventional digital SLR cameras, and accordingly, the description of the linkage mechanism is omitted from the following description. However, the diaphragm drive mechanism 40 is configured to operate independently of the mirror drive mechanism 50 to allow the diaphragm 201 to be adjusted at anytime for capturing object images via the image pickup device 14 independently of operations of the main mirror 21.

Figure 5:
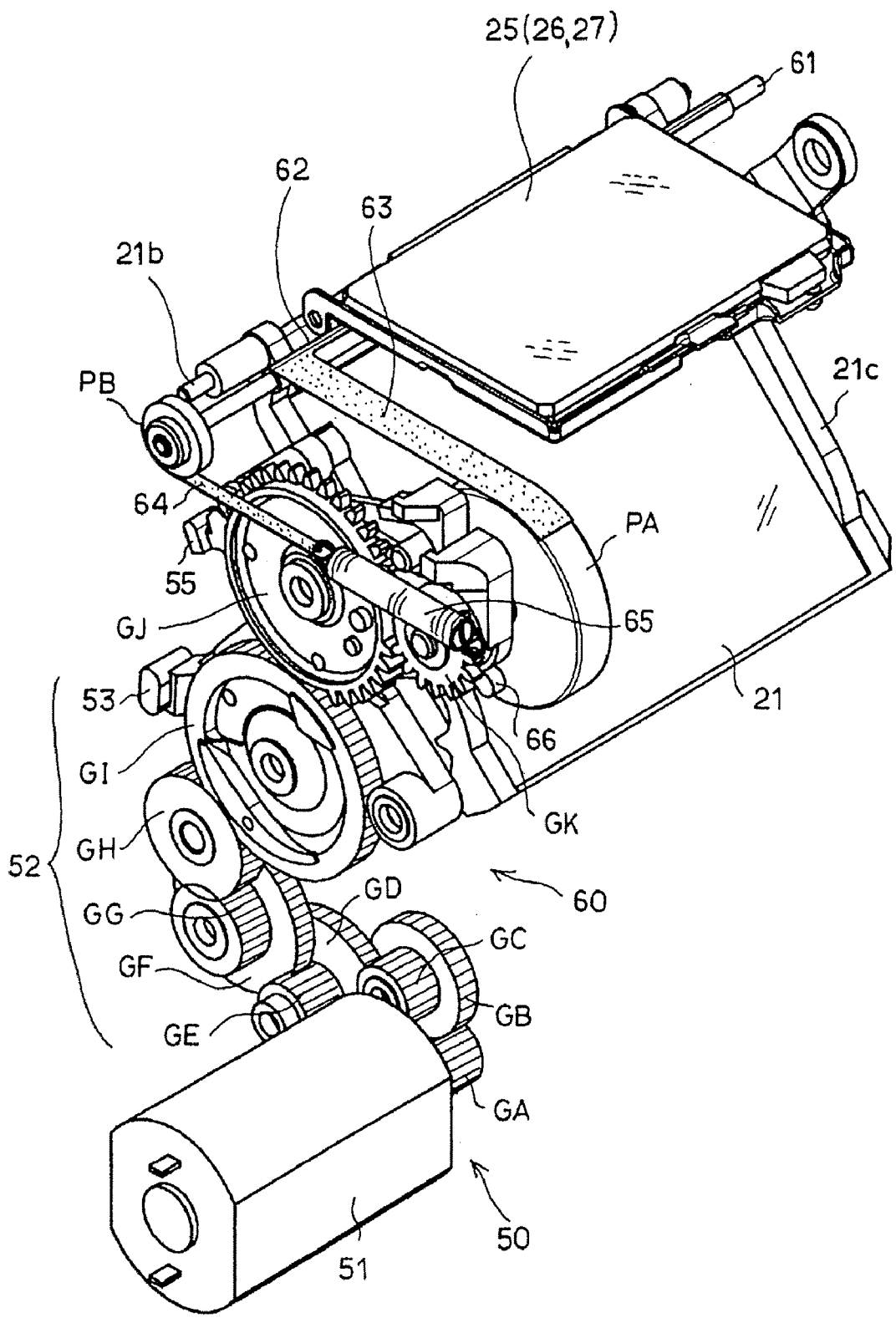
FIG. 5 is a perspective view of elements of a mirror drive mechanism and a light shielding screen drive mechanism that are provided in the camera body shown in FIGS. 1 and 2.
Figure 6:
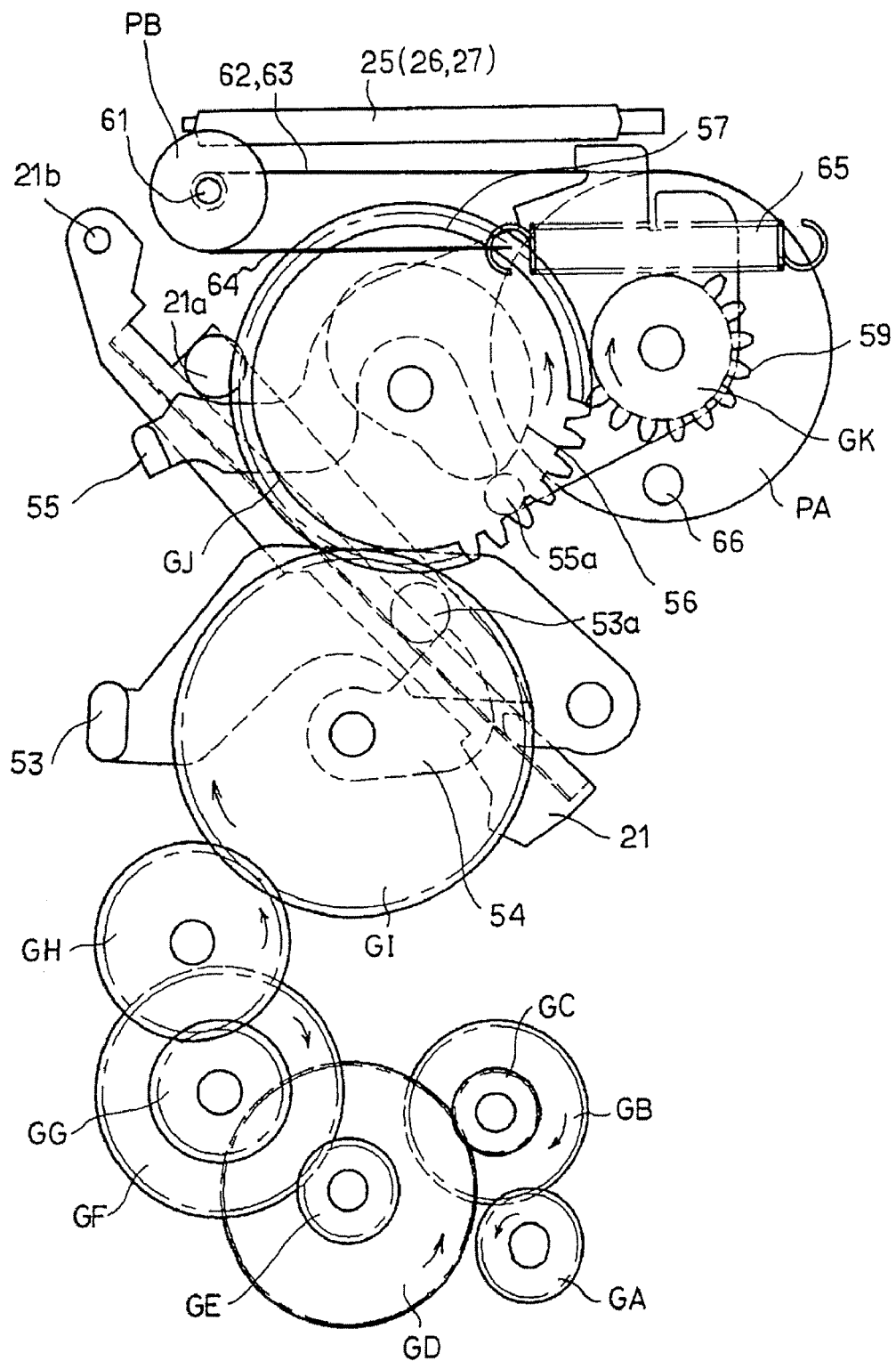
FIG. 6 is a side elevational view of the elements of the mechanisms shown in FIG. 5, viewed from the left side in FIG. 5.

The mirror drive mechanism 50 is arranged on the left side of the mirror box 20 between the diaphragm drive mechanism support plate 41 and the mirror box 20. A light shield screen drive mechanism 60 is integrated into the mirror drive mechanism 50. FIG. 5 is a perspective view of elements of the mirror drive mechanism 50 and the light shielding screen drive mechanism 60. FIG. 6 is a side elevational view of these elements viewed from the left side of the camera body 1. The focusing screen 25 is positioned directly above the main mirror 21 in the mirror box 20. The mirror drive mechanism 50 and the light shielding screen drive mechanism 60 are provided with a gear train 52 including a plurality of gears GA through GK (GA, GB, GC, GD, GE, DF, GG, GH, GI, GJ and GK). The gear GA is fixedly fitted on the rotary shaft of the mirror drive motor 51 that is supported by the diaphragm drive mechanism support plate 41. The gears GB and GC are integral with each other to be formed as a first double gear, the gears GD and GE are integral with each other to be formed as a second double gear, and the gears GF and GG are integral with each other to be formed as a third double gear as shown in FIGS. 5 and 6. From the gear GA to the gear GK, the gear GA is in mesh with the gear GB of the first double gear, the gear GC of the first double gear is in mesh with the gear GD of the second double gear, the gear GE of the second double gear is in mesh with the gear GF of the third double gear, the gear GG of the third double gear is in mesh with the gear GH, the gear GH is in mesh with the gear GJ, and the gear GJ is in mesh with the gear GK. The rotary power of the mirror drive motor 51 is transferred to the gear GK of the gear train 52. Among the gears GA through GK of the gear train 52, the gear GI (shown by a broken line in FIGS. 6 and 9) is formed integral with a shutter charge cam 54 to make the shutter charge cam 54 rotate integrally with the gear GI. The shutter charge cam 54 is engaged with an engaging portion 53a of a shutter charge lever 53 positioned adjacent to the gear GI. The shutter charge lever 53 is biased to rotate counterclockwise as viewed in FIG. 6 by a spring device (not shown). A clockwise rotation of the gear GI causes the shutter charge cam 54 to rotate together in the same rotational direction to thereby charge the shutter. This mechanism is similar in structure to those of conventional SLR digital cameras, and accordingly, the description of this mechanism is omitted from the following description.

The gear GJ (shown by a broken line in FIGS. 6 and 9) is formed integral with a shutter lock release cam 56 to make the shutter lock release cam 56 rotate integrally with the gear GJ. The shutter lock release cam 56 is engaged with an engaging portion 55a of a shutter lock release lever 55 positioned adjacent to the gear GJ. The shutter lock release lever 55 is biased to rotate counterclockwise as viewed in FIG. 6 by a spring device (not shown). A part of the shutter lock release lever 55 in the vicinity of the left end thereof as viewed in FIG. 6 is positioned immediately below an engaging portion 21a of the main mirror 21 to be engaged therewith. The main mirror 21 is biased to rotate clockwise as viewed in FIG. 6 by a spring device (not shown). The biasing force of this spring device brings the main mirror 21 to be held in the aforementioned lower position thereof, in which the main mirror 21 lies on the optical axis of the photographing lens 2. When the main mirror 21 is in the lower position, the engaging portion 21a of the main mirror 21 is in contact with the shutter lock release lever 55. A counterclockwise rotation of the gear GJ as viewed in FIG. 6 causes the shutter lock release cam 56 to rotate together therewith in same rotational direction. This counterclockwise rotation of the shutter lock release cam 56 causes the shutter lock release lever 55 to rotate clockwise, and subsequently this clockwise rotation of the shutter lock release lever 55 causes the main mirror 21 to rotate upward (counterclockwise as viewed in FIG. 6) about the mirror shaft 21b via the engagement of the engaging portion 21a with the shutter lock release lever 55 so that the main mirror 21 rises to the aforementioned upper position (shown in FIGS. 8 and 9), in which the main mirror 21 has fully retracted from a position on the optical axis of the photographing lens 2.

Figure 7A:
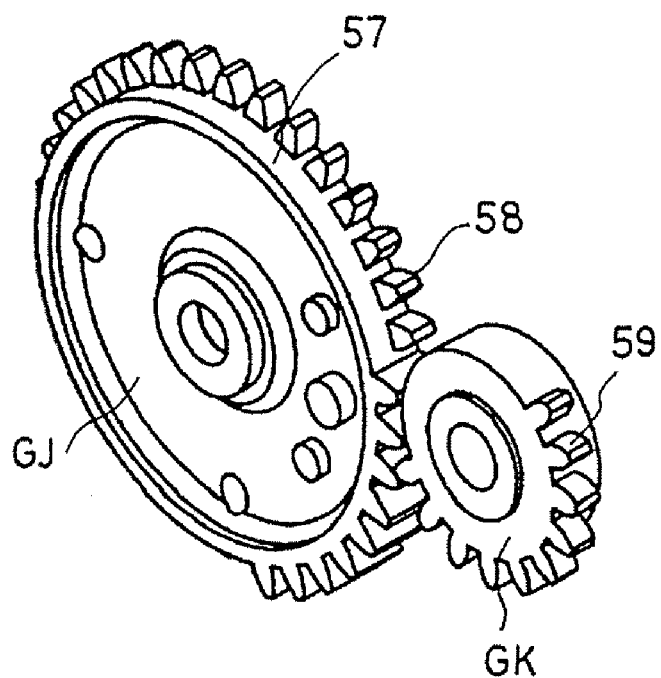
FIGS. 7A and 7B are perspective views of two gears GJ and GK shown in FIGS. 5 and 6 in different states.
Figure 7B:
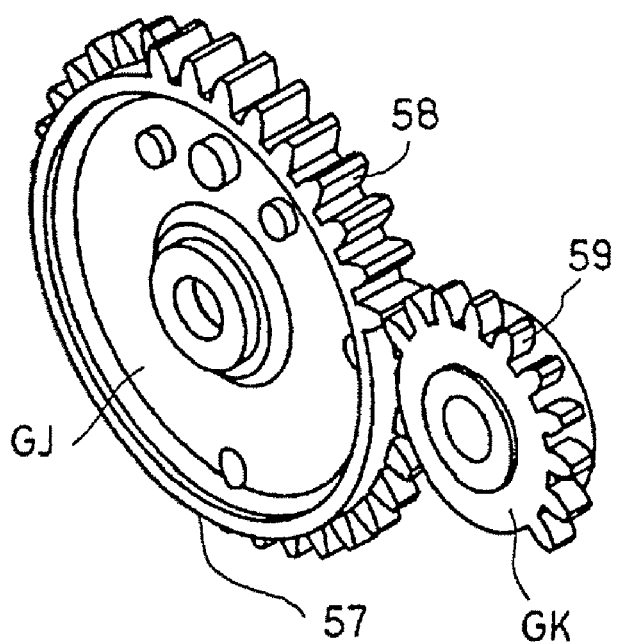

As shown in FIGS. 7A and 7B, that show external perspective views of the gears GJ and GK in different states, the gear GJ is provided, on a part of the outer edge thereof in a half range of this outer edge in the axial direction of the gear GJ, with a toothless portion 57 on which none of the gear teeth 58 of the gear GJ are formed. The gear GK is provided on a part of the outer edge thereof with a toothed sector portion 59 which does not mesh with the gear teeth 58 when the toothless portion 57 faces the gear GK, i.e., which meshes with the gear teeth 58 only when the toothless portion 57 does not face the gear GK. Upon the gear GJ being rotated to a predetermined rotational position counterclockwise as viewed in FIG. 7A, the gears GJ and GK are engaged with each other so that rotation of the gear GJ is transferred to the gear GK. If the gear GJ is further rotated counterclockwise to a rotational position shown in FIG. 7B, the gear teeth 58 of the gear GJ and the toothed sector portion 59 of the gear GK are disengaged from each other, thus causing the gear GK to enter a free rotational state and face the toothless gear portion 57.

The light shield screen drive mechanism 60 is provided with a large-diameter winding pulley PA and a small-diameter driving pulley PB. The winding pulley PA is formed integral with the gear GK to be coaxial therewith. The camera body 1 is provided in the vicinity of the mirror shaft 21b with a light-shield-screen shaft 61 which is parallel to the mirror shaft 21b, and the driving pulley PB is fixedly fitted on the light-shield-screen shaft 61 to be supported thereby. The light-shield-screen shaft 61 is located at a position facing the lower surface of the focusing screen 25 in the vertical direction of the camera body 1 to be capable of rotating on the axis of the light-shield-screen shaft 61 relative to the camera body 1. A light shield screen 62 is wound around the light-shield-screen shaft 61. The light shield screen 62 is made of a thin opaque flexible film or sheet and has dimensions enabling the light shield screen 62 to cover the reflecting surface of the main mirror 21. A part of the light shield screen 62 is extended in a strip shape to be formed as a guide belt 63. An end of the guide belt 63 is fixed to a part of the outer edge of the winding pulley PA. The left end of the light-shield-screen shaft 61 (i.e., on one of the opposite ends of the light-shield-screen shaft 61 which is adjacent to the mirror drive mechanism 50) extends through the diaphragm drive mechanism support plate 41, and the drive pulley PB is fixedly fitted on the left end of the light-shield-screen shaft 61 to be supported thereby. A narrow drive belt 64 is wound around the drive pulley PB. An extension coil spring 65 is installed between the end of the drive belt 64 and a part of the diaphragm drive mechanism support plate 41. The winding pulley PA is provided on one side thereof with a stop pin 66. When the winding pulley PA rotates, the stop pin 66 comes in contact with a stationary portion of the mirror box 20 to limit the position of the light shield screen 62 that is wound around the light-shield-screen shaft 61 by the spring force of the extension coil spring 65.

Figure 8:
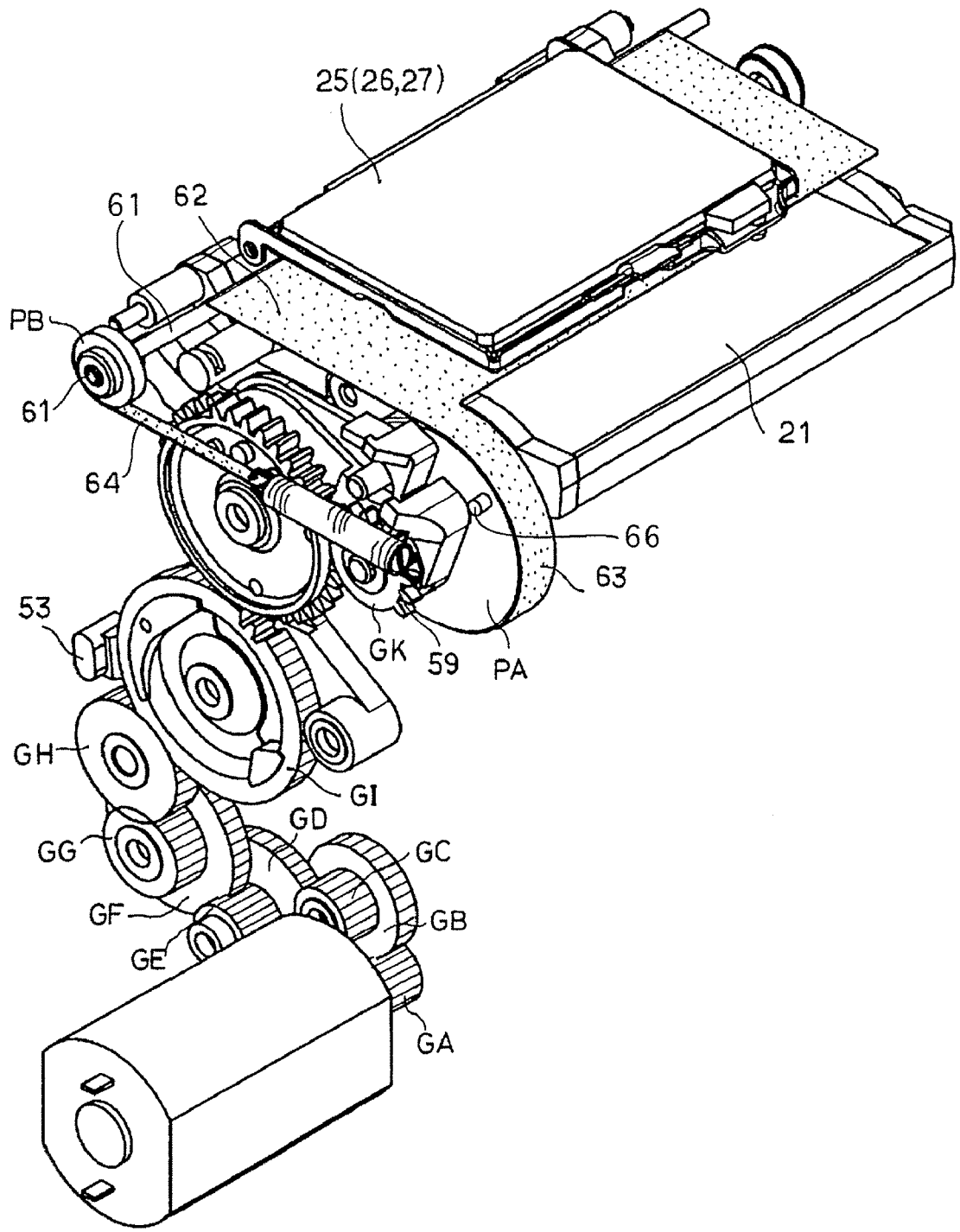
FIG. 8 is a perspective view of the elements of the mirror drive mechanism and the light shielding screen drive mechanism that are shown in FIG. 5 in a different state, illustrating operations of these two mechanisms.
Figure 9:
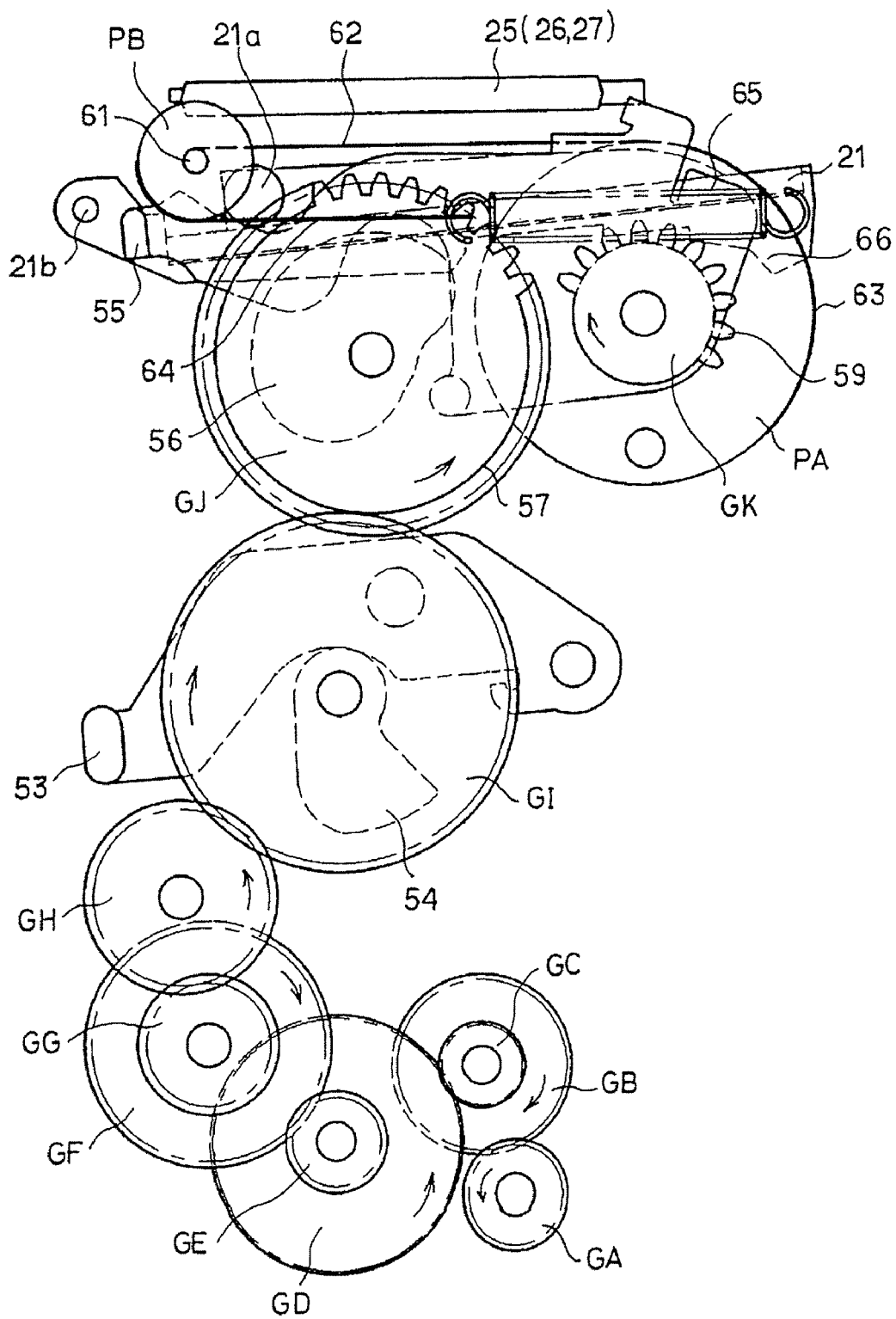
FIG. 9 is a side elevational view of the elements of the mechanism shown in FIG. 8, viewed from the left side in FIG. 8.

In the mirror drive mechanism 50 and the light shield screen drive mechanism 60, upon the mirror drive motor 51 rotating at a shutter release or at the time that the main mirror 21 is operated to rise to the upper position upon the user turning ON the EL display ON/OFF button 12 or turning ON a mirror switch (not shown), rotation of the gear GA by rotation of the mirror drive motor 51 is transferred to the gear GJ via the intermediate gears GB through GI to rotate the gear GJ counterclockwise, and this counterclockwise rotation of the gear GJ causes the shutter lock release lever 55 to rotate clockwise against the spring force of the aforementioned associated spring device, thus causing the main mirror 21 to rise to the upper position as shown in FIGS. 8 and 9 which show a perspective view and a left side elevational view of the elements of the mirror drive mechanism 50 and the light shielding screen drive mechanism 60. Upon the gear GJ being rotated counterclockwise to a predetermined rotational position, the toothless portion 57 of the gear GJ is positioned off (away from) the toothed sector portion 59 of the gear GK and the gear teeth 58 of the gear GJ are engaged with the toothed sector portion 59 of the gear GK so that the gear GK rotates clockwise. This rotation of the gear GK causes the winding pulley PA that is integral with the gear GK to rotate clockwise to wind the guide belt 63 of the light shield screen 62 around the winding pulley PA. Accordingly, the light shield screen 62 is drawn from the light-shield-screen shaft 61 so as to cover the reflecting surface of the main mirror 21. This drawing movement of the light shield screen 62 causes the light-shield-screen shaft 61 to rotate on the axis thereof, and this rotation of the light-shield-screen shaft 61 causes the drive belt 64 to be wound around the drive pulley PB while extending the extension coil spring 65.

Upon the completion of an exposure or (at the time that the main mirror 21 is manually operated to move down to the lower position upon the user turning ON the EL display ON/OFF button 12 or turning ON a mirror switch (not shown), a further rotation of the mirror drive motor 51 causes the gear GJ to further rotate counterclockwise, thus causing the main mirror 21 to move down to the lower position so that the main mirror 21 returns to the normal position (initial position) on the optical axis of the photographing lens 2. At the same time, the counterclockwise rotation of the gear GJ causes the toothless portion 57 thereof and the toothed sector portion 59 of the gear GK to face each other, thus causing the gear GJ and the gear GK to be disengaged from each other so that each of the gear GK and the winding pulley PA enters a free state. Therefore, the drive belt 64 is pulled by the spring force of the extension coil spring 65, so that the drive pulley PB rotates counterclockwise together with the gear GK while the light-shield-screen shaft 61 that is integral with the drive pulley PB rotates counterclockwise. Consequently, the light shield screen 62 is wound around the light-shield-screen shaft 61 to be retracted from the space immediately below the focusing screen 25 to thereby return to the initial state.

Figure 10:
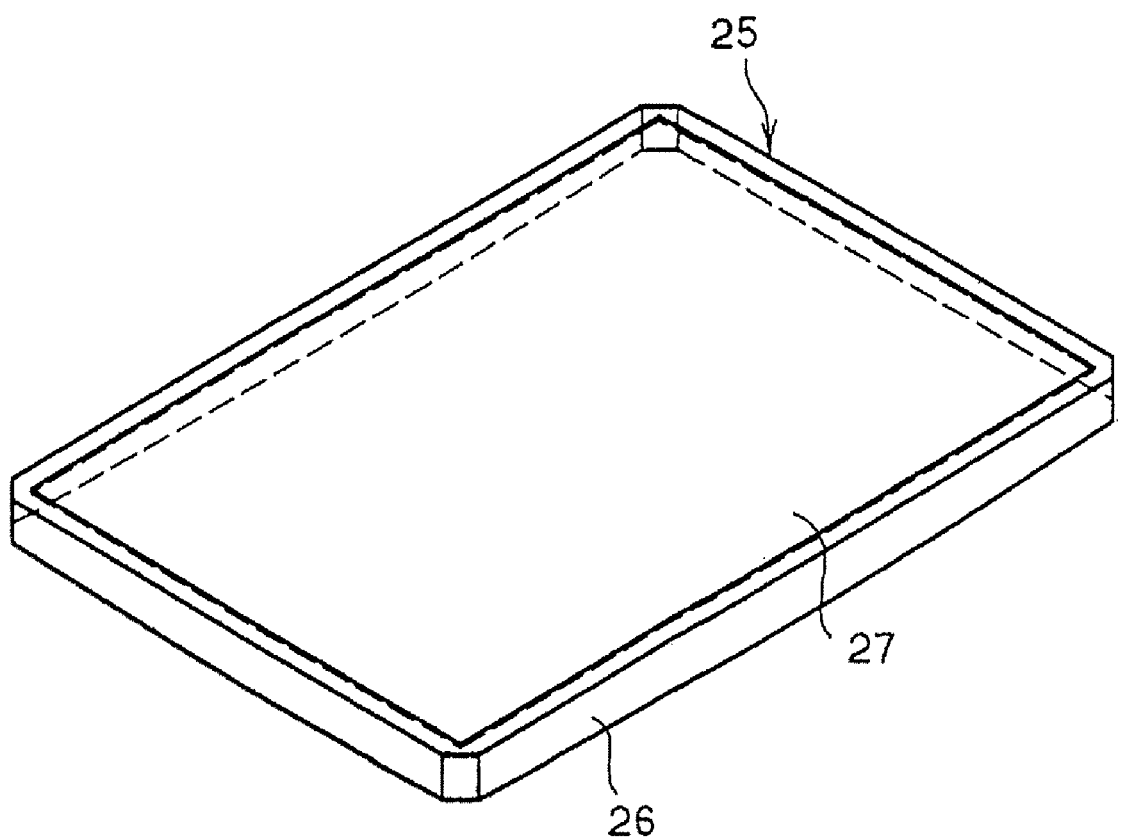
FIG. 10 is a perspective external view of the focusing screen shown in FIGS. 5, 6, 8 and 9.
Figure 11A:
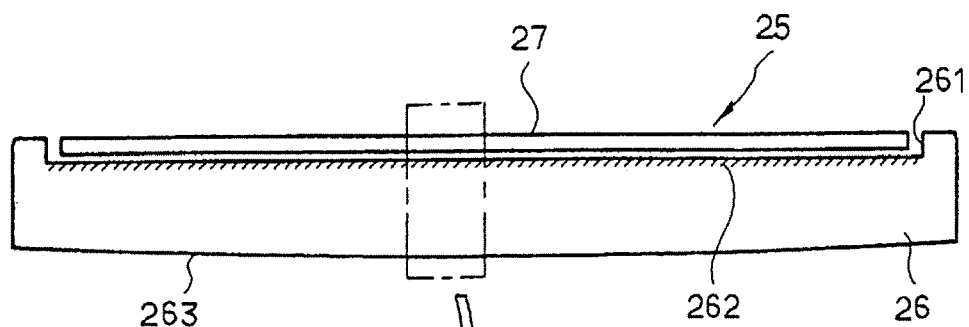
FIG. 11A is a cross sectional view of the focusing screen shown in FIG. 10.
Figure 11B:
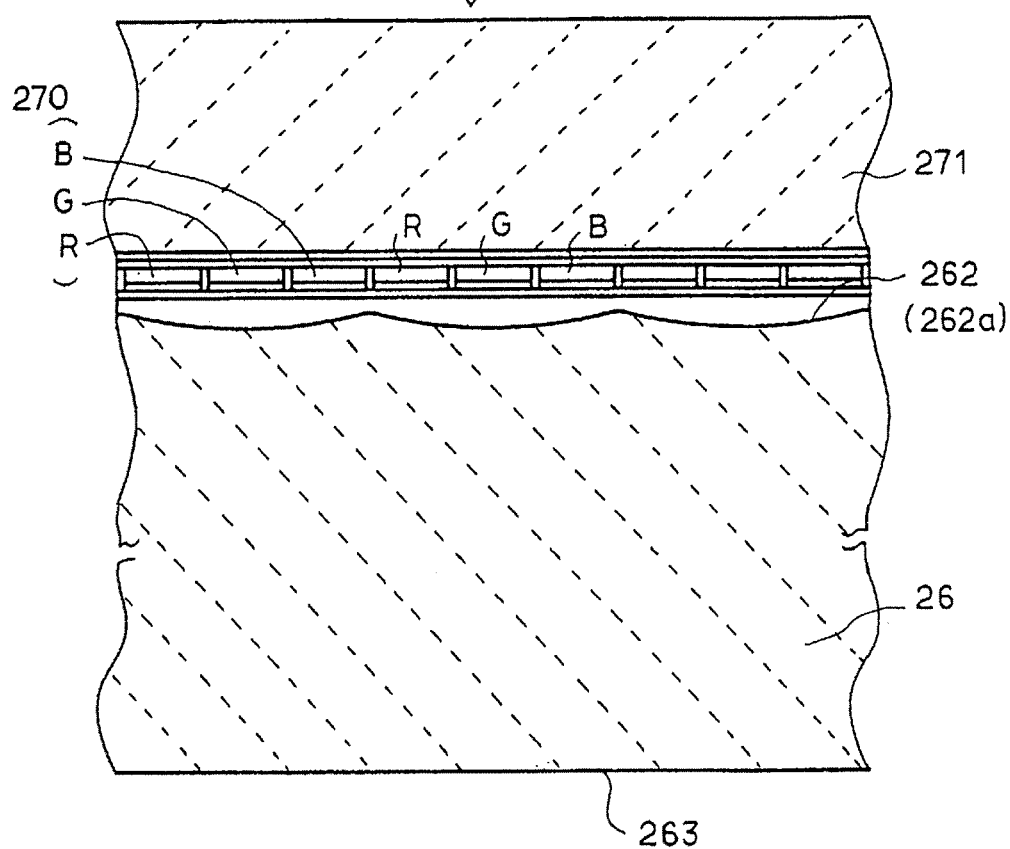
FIG. 11B is an enlarged cross sectional view of a portion of the focusing screen shown in FIG. 11A.

FIG. 10 is a perspective external view of the focusing screen 25 that is installed in the mirror box 20, FIG. 11A is a cross sectional view of the focusing screen 25 and FIG. 11B is an enlarged cross sectional view of a portion of the focusing screen 25. The focusing screen 25 is provided with a rectangular image forming plate 26 and a rectangular EL display 27 which is formed to extend over substantially the entire front surface (upper surface as viewed in FIGS. 11A and 11B) of the image forming plate 26 except the peripheral edge of the front surface thereof. The EL display 27 is embedded in a shallow recess 261 formed on the front surface of the image forming plate 26. The image forming plate 26 is made of a transparent resin plate (e.g., PMMA (acrylic resin) or PC (polycarbonate resin)) having a thickness of approximately 1 millimeter, a front surface of the image forming plate 26

(specifically the bottom surface in the recessed portion 261) is formed to be a light diffusing surface 262 that allows the photographer to see an image formed on the light diffusing surface 262. Specifically, the light diffusing surface 262 is made by roughening the front surface of the image forming plate 26 (the bottom surface in the recessed portion 261) by forming thereon microscopic asperities 262a in the size range of approximately two micrometers. The image forming plate 26 is formed to also serve as an optical condenser; a back surface 263 (lower surface as viewed in FIGS. 11A and 11B) of the image forming plate 26 is formed as a lens surface or a Fresnel lens surface.

Figure 12:
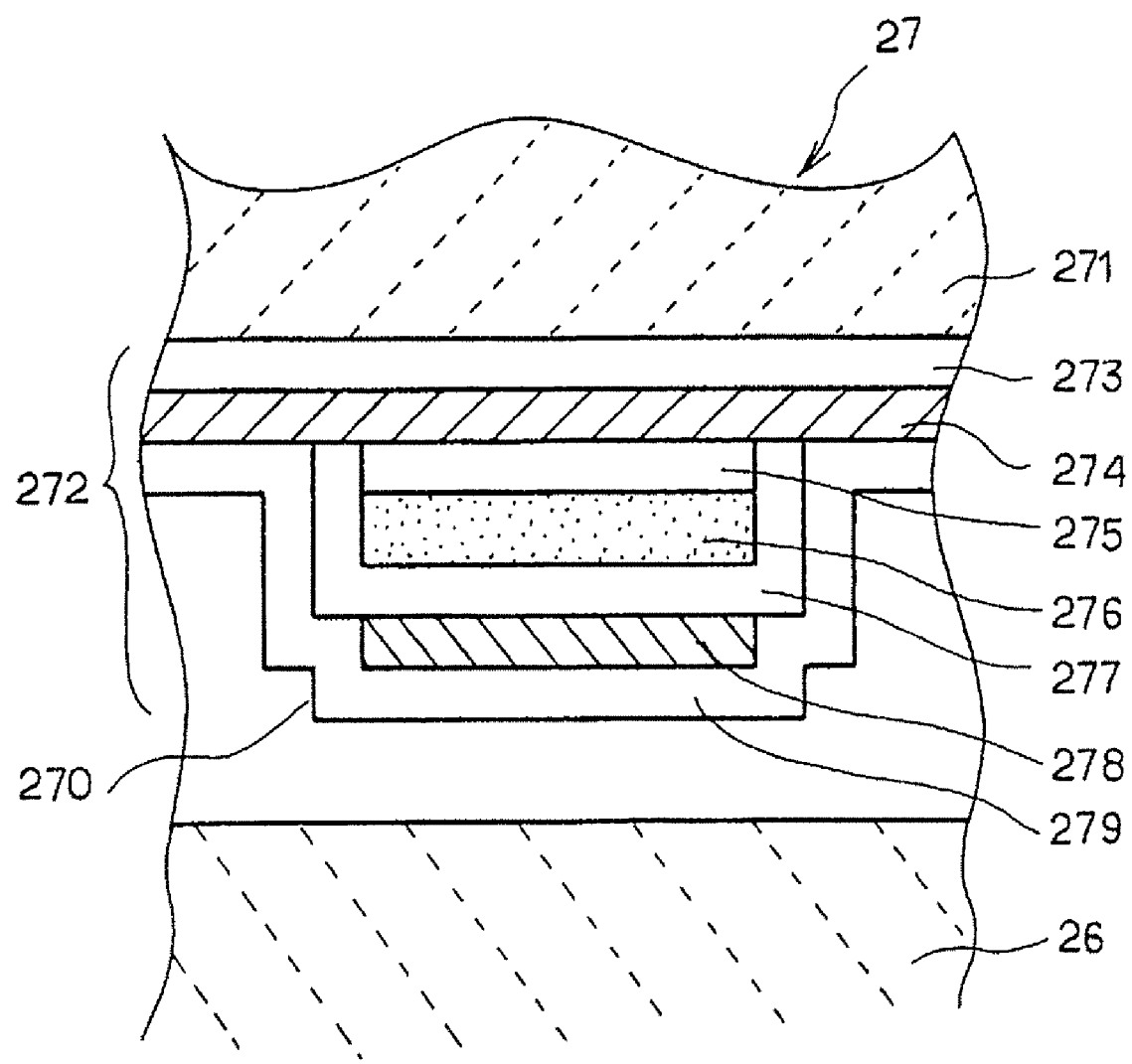
FIG. 12 is an enlarged cross sectional view of an electroluminescent portion of the focusing screen shown in FIGS. 10, 11A and 11B.

The EL display 27 is constructed as a full-color EL display and is provided thereon with a matrix of red (R), green (G) and blue (B) pixels 270 arranged in a plane. As shown in FIG. 12 that shows a portion of one pixel 270, each pixel 270 has a multilayer structure. As shown in FIG. 12, the EL display 27 is provided with a transparent EL substrate (transparent substrate) 271, a transparent outer film 26, and an EL portion 272. The transparent EL substrate 271 is made of a transparent film and serves as a film base of the EL display 27. The EL portion 272 is made of the aforementioned array of pixels 270 arranged two-dimensionally on a surface (lower surface as viewed in FIG. 12) of the transparent EL substrate 271. A moisture-proof barrier film 273 is formed on the lower surface of the transparent EL substrate 271 and a transparent substrate-side electrode film 274 is formed on the lower surface of the moisture-proof barrier film 273. In addition, an insulating layer 275, a luminous layer 276 and an insulating layer 277 are layered in that order on the substrate-side electrode film 274 to correspond to each pixel 270. The substrate-side electrode film 274 is a transparent film made of ITO (Indium Tin Oxide), has a thickness of 25 to 100 nanometers and is formed on the moisture-proof barrier film 273 in a predetermined pattern. Additionally, a transparent front-side electrode 278 is formed on the insulating layer 277, and thereafter the remaining outer surfaces of the substrate-side electrode film 274, the insulating layer 275 and the front-side electrode 278 are fully coated with a moisture-proof barrier layer 279. The front-side electrode 278 is a transparent film made of IZO (Indium Zinc Oxide) and has a thickness of 25 to 100 nanometers. In the EL display 27, the luminous layer 276 of each pixel 270 emits light (red, green and/or blue lights) by applying a high-strength electric field to the luminous layer 276 by applying a predetermined voltage between the substrate-side electrode film 274 and the front-side electrode 278. Therefore, selectively making the desired pixels 270 emit light makes it possible to bring the EL display 27 to display a desired color pattern (color image). The EL display 27 remains transparent when no voltage is applied between the substrate-side electrode film 274 and the front-side electrode 278.

The transparent EL substrate 271 is formed a transparent resin film made of, e.g., one of the following resin materials: PET (polyethylene terephthalate), PES (polyethersulfone), PAr (Polyarylate) and PC (polycarbonate) with a thickness of approximately 75 micrometers. Each of the insulating layers 275 and 277 is formed a silicon dioxide film having a thickness of 0.2 to 0.3 micrometers, while each of the moisture-proof barrier films 273 and 279 is formed from a silicon nitride film having the same degree of thickness as each of the insulating layers 275 and 277. The luminous layer 276 has a thickness of 0.5 to 1.0 micrometers. If the luminous layer 276 is made as inorganic EL, the red pixel is made of CaS:Eu, ZnS:Sm and the like, the green pixel is made of Zn:Tb and the like and the blue pixel is made of SrS:Ce, CaGa$_2$S$_4$:Ce and the like. If the luminous layer 276 is made as organic EL, the red pixel is made of Eu(DBM)$_3$(Phen) (Eu complex), the green pixel is made of Alq (Tris(8-quinolinolato)aluminum) and the blue pixel is made of DPVBi (distyrylarylene derivative).

The EL display 27 having the above described structure is embedded in the recess 261 of the image forming plate 26 with the front side (the lower side as viewed in FIGS. 11A and 11B) of the EL display 27 facing the rear surface of the image forming plate 26. A transparent sealant (not shown) is filled in the gap between the recessed portion of the image forming plate 26 and the EL display 27 to seal the gap therebetween and to form the image forming plate 26 and the EL display 27 integral with each other to thereby constitute the focusing screen 25.

Figure 13:
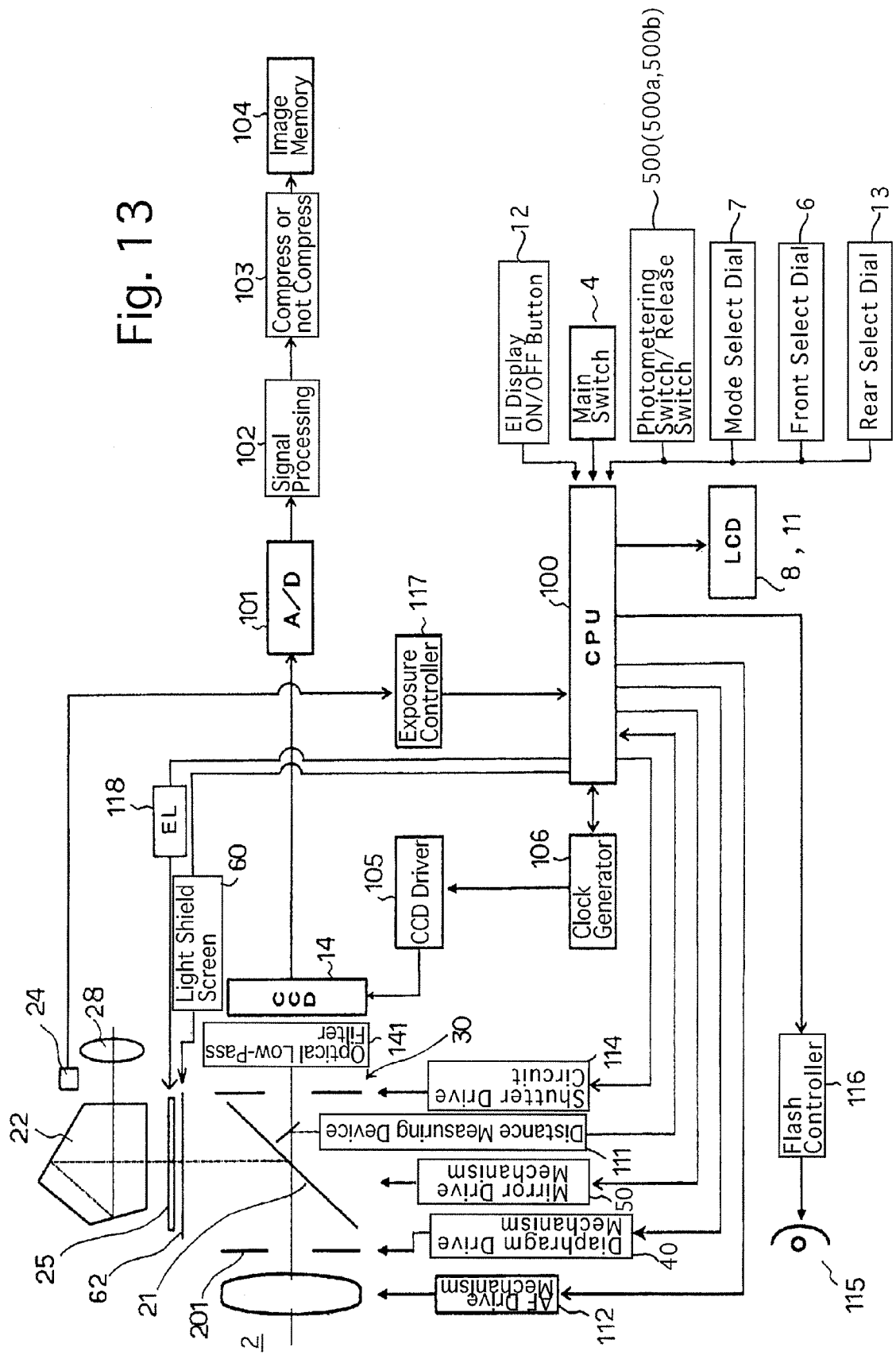
FIG. 13 is a block diagram of components of the SLR digital camera shown in FIGS. 1 and 2, showing the overall structure thereof.

FIG. 13 is a block diagram of components of the SLR digital camera shown in FIGS. 1 and 2. An object image is formed on the image pickup device 14 via the photographing lens 2 and an optical low-pass filter 141, and the image pickup device 14 picks up this object image formed thereon to output an image signal. This image signal is converted into a digital image signal by an A/D converter 101. This digital image signal is subjected to predetermined signal processing such as a color processing and a gamma control processing in a signal processing circuit 102. Subsequently, this processed digital signal is compressed or not compressed in a compressing circuit 103 before being written into a VRAM (image memory) 104. It is possible to set an accumulation time (integral action time) at the image pickup device 14 at a time of exposure by controlling a CCD driver 105 via a clock generator 106 by a CPU 100.

The CPU 100 controls the operation of an AF (autofocus) drive mechanism 112 based on an object distance measured by a distance measuring device 111 when an object image is taken (captured). Additionally, the CPU 100 controls the operation of a mirror drive mechanism 50 to drive the main mirror 21, and the CPU 100 controls the operation of rotation of the shutter lock release lever 55 to charge the shutter and subsequently release the shutter, and simultaneously the CPU 100 controls the operation of a shutter drive circuit 114 so that the shutter unit 30 opens and shuts the shutter. At the same time, the CPU 100 controls the operation of a diaphragm drive mechanism 40 to stop down a diaphragm 201 provided in the photographing lens 2. In addition, the CPU 100 operates to make each of the information-indicating LCD panel 8 and the external LCD monitor 11 display required data. The CPU 100 also controls the operation of a flash controller 116 for controlling the discharge of a flash 115 that is a built-in flash or an external flash. Additionally, the CPU 100 controls the operation of an exposure controller 117 based on a photometric signal output from the photometering element 24.

Information on the operation of the main switch 4, ON/OFF switch information on a combination photometering/release switch 500 including a photometering switch 500a and a release switch 500b which are turned ON when the release button 5 is halfway and fully depressed, respectively, and mode information on selected modes which are manually selected with the mode select dial 7 are all input to the CPU 100. Additionally, information on the operation of the EL display ON/OFF button 12 for displaying a required image is input to the CPU 100. The camera body 1 is further provided therein with an EL drive circuit 118 which drives the EL display 27 that is integral with the focusing screen 25 to make the EL display 27 display a required image. It is possible that the CPU 100 make the EL drive circuit 118 operate so that the EL display 27 displays a required image upon the mode select dial 7 or the EL display ON/OFF button 12 being operated. In addition, the CPU 100 can control the operation of the light shield screen drive mechanism 60 to insert and retract the light shield screen 62 into and from the space immediately below the focusing screen 25.

Operations of the SLR digital camera having the above described structure will be hereinafter discussed with reference to the flow charts shown in FIGS. 14A and 14B. This control is carried out when the main switch 4 is turned ON. Firstly, an EL display flag fEL is set to zero (fEL=0) (step S101). Subsequently, it is determined whether the photographing lens 2 is of a type having an image stabilizing capability (step S104), and thereafter it is determined whether the EL display ON/OFF button 12 has not been operated to be turned ON (step S105) if it is determined at step S104 that the photographing lens 2 is not of a type having an image stabilizing capability (if YES at step S104). If it is determined that the photographing lens 2 is not of a type having an image stabilizing capability (if YES at step S104) and it is further determined that the EL display ON/OFF button 12 has not been operated (if YES at step S105), control proceeds to step S112 at which an optical image display control flow "F1" starts. On the other hand, if the photographing lens 2 is of a type having an image stabilizing capability (if NO at step S104) or if the EL display ON/OFF button 12 has been operated (if NO at step S105), control proceeds to step S121 at which an EL display control flow "F2" starts.

The operations of the optical image display control flow F1 are identical to those in conventional SLR digital cameras. Before control enters the optical image display control flow "F1", the SLR digital camera in is a state where the main mirror 21 is in the lower position while the light which is passed through the photographing lens 2 is reflected by the main mirror 21 to be formed on the focusing screen 25. The photographer looks into the viewfinder window 10 to view an optical image of an object, which is formed on the focusing screen 25 via the photographing lens 2, through the pentagonal prism 22 and the eyepiece 28. Upon the release button 5 being depressed halfway to thereby turn ON the photometering switch 500a (step S112, Y), the AF drive mechanism 112 is driven to adjust the focus of the photographing lens 2 in accordance with an object distance measured using the distance measuring device 111 (step S113), and a photometering operation is performed with the photometering element 24 to determine an f-number and a shutter speed (step S114). Subsequently, upon the release button 5 being fully depressed to thereby turn ON the release switch 500b (step S115, Y), the mirror drive mechanism 50 is actuated so that the main mirror 21 rises (step S116). Upon the main mirror 21 rising to the upper position, the shutter drive mechanism 31 is actuated to open the focal plane shutter of the shutter unit 30 so that the image pickup device 14 picks up an object image formed thereon via the photographing lens 2 (step S130). This object image picked up by the image pickup device 14 is written as image data into the image memory 104 (step S131). Thereafter, it is determined whether the main switch 5 is OFF (step S132). If the main switch 5 is ON (if NO at step S132), control returns to step S104. If the main switch 5 is OFF (if YES at step S132), control ends.

At step S130, when a predetermined exposure time has lapsed, the shutter drive mechanism 31 is actuated to close the focal plane shutter of the shutter unit 30 and the mirror drive mechanism 50 is actuated so that the main mirror 21 is moved down.

In the optical image display control flow "F1", if the photometering switch 500a is not turned ON (step S112, N) control proceeds to step S132, or if after the photometering switch 500a is turned ON, the release switch 500b is not turned ON (step S115, N), and the photometering switch 500a is turned OFF, control proceeds to step S132.

On the other hand, upon control entering the EL display control flow "F2", it is determined whether the EL display flag fEL is equal to zero (fEL=0) (step S121). If the display flag fEL is zero (fEL=0) (if YES at step S121), the mirror drive mechanism 50 is actuated so that the main mirror 21 rises (step S122) and the EL display flag fEL is set to 1 (step S122a). Upon the main mirror 21 rising to the upper position, the shutter drive mechanism 31 is actuated to open the focal plane shutter of the shutter unit 30 and the image pickup device 14 picks up an object image formed thereon via the photographing lens 2. If the display flag fEL is not zero (if NO at step S121), control skips step S122 because the main mirror 21 has already risen to the upper position. Subsequently, upon the release button 5 being depressed halfway to thereby turn ON the photometering switch 500a (step S123, Y), a contrast-based AF operation in which the AF drive mechanism 112 is driven to adjust the focus of the photographing lens 2 based on contrast values obtained from the image signals of an object image obtained via the image pickup device 14 (step S124). Subsequently, a photometering operation is performed to measure the brightness of the object image from the light received by elements of the CCD that constitutes the image pickup device 14 (step S125). The image signal obtained via the image pickup device 14 is subjected to predetermined signal processing as mentioned above to obtain a visual image of the object. At this time, the EL drive circuit 118 is driven so that the object image is displayed as a live digital image on the EL display 27 (step S126). Consequently, the photographer can view this object image through the pentagonal prism 22 and the eyepiece 28 since the object image is displayed in full color on the focusing screen 25 by the EL display 27. At this time, it is possible to make the external LCD monitor 11 display the same object image (live digital image) (step S127). Subsequently, control proceeds to step S133 to pick up an object image by the image pickup device 14 upon the photographer fully depressing the release button 5 while viewing the object image displayed in the field of view of the viewfinder by the EL display 27 (step S128, Y).

At step S133, the image pickup device 14 picks up an object image formed thereon via the photographing lens 2 for a predetermined exposure time (electronic shutter). This object image picked up by the image pickup device 14 is written as image data into the image memory 104 (step S134).

Thereafter, it is determined whether the main switch 5 is OFF (step S135). If the main switch 5 is OFF (if YES at step S135), the mirror drive mechanism 50 is actuated so that the main mirror 21 moves down to the lower position, actuates the shutter drive mechanism 31 to close the focal plane shutter of the shutter unit 30, and stops the operation of the EL drive circuit 118 (step S140), and control ends. If the main switch 5 is ON (if NO at step S135), control proceeds to step S136.

At step S136, it is determined whether the photographing lens 2 is of a type having an image stabilizing capability (step S136), and thereafter it is determined whether the EL display ON/OFF button 12 has not been operated to be turned ON (step S137). If the photographing lens 2 is of a type having an image stabilizing capability (if NO at step S136) or if the EL display ON/OFF button 12 has been operated (if NO at step S137), control proceeds to step S121 and repeat the EL display control flow "F2".

If it is determined that the photographing lens 2 is not of a type having an image stabilizing capability (if YES at step S136) and it is further determined that the EL display ON/OFF button 12 has not been operated (if YES at step S137), control proceeds to step S138.

At step S138, the mirror drive mechanism 50 is actuated so that the main mirror 21 moves down to the lower position, actuates the shutter drive mechanism 31 to close the focal plane shutter of the shutter unit 30, and stops the operation of the EL drive circuit 118, (step S138).

Subsequently, the EL display flag fEL is set to zero (step S139) and control returns to step S103.

Figure 15A:
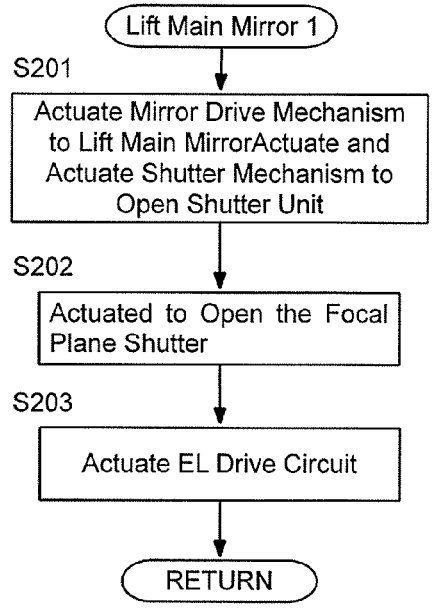

The Lift Mirror Process performed at steps S116 and S122 will be hereinafter discussed in detail with reference to the flow chart shown in FIG. 15A. The mirror drive mechanism 50 is actuated so that the main mirror 21 rises to the upper position and the shutter drive mechanism 31 is actuated so that the focal plane shutter of the shutter unit 30 is opened (step S201), the shutter drive mechanism 31 is actuated to open the focal plane shutter of the shutter unit 30 (step S202) and the CPU 100 actuates the EL drive circuit 118 at the same time (step S203). The operation of the mirror drive mechanism 50 following the actuation thereof at step S201 causes the light shield screen drive mechanism 60 to be driven to make the light shield screen 62 advance into the space between the main mirror 21 which is in the upper position and the focusing screen 25. Due to this insertion of the light shield screen 62, the reflecting surface of the main mirror 21 is covered by the light shield screen 62. Consequently, when the EL display 27 that is incorporated in the focusing screen 25 displays an image, the light of this image which emerges downward from the EL display 27 is not reflected by the main mirror 21, and accordingly, only an image which is formed by the light emerging upward from the EL display 27 is seen through the viewfinder, which enhances the image quality.

Figure 15B:
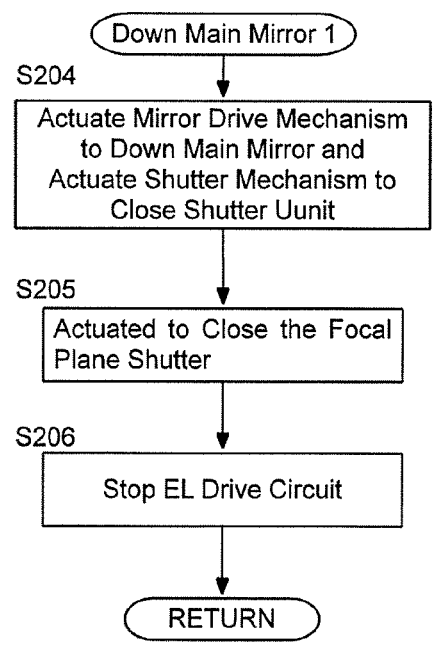

The Down Mirror Process performed at steps S138 and S140 will be hereinafter discussed in detail with reference to the flow chart shown in FIG. 15B. The mirror drive mechanism 50 is actuated so that the mirror moves down to the lower position (step S204), the shutter drive mechanism 31 is actuated to close the focal plane shutter of the shutter unit 30 (step S205) and the CPU 100 stops the operation of the EL drive circuit 118 (step S206). At the same time, the light shield screen 62 is wound around the light-shield-screen shaft 61 by the operation of the light shield screen drive mechanism 60 to be retracted from the space between the main mirror 21 and the focusing screen 25 to thereby allow an optical object image which is reflected by the main mirror 21 to be focused on the focusing screen 25.

Figure 14A:
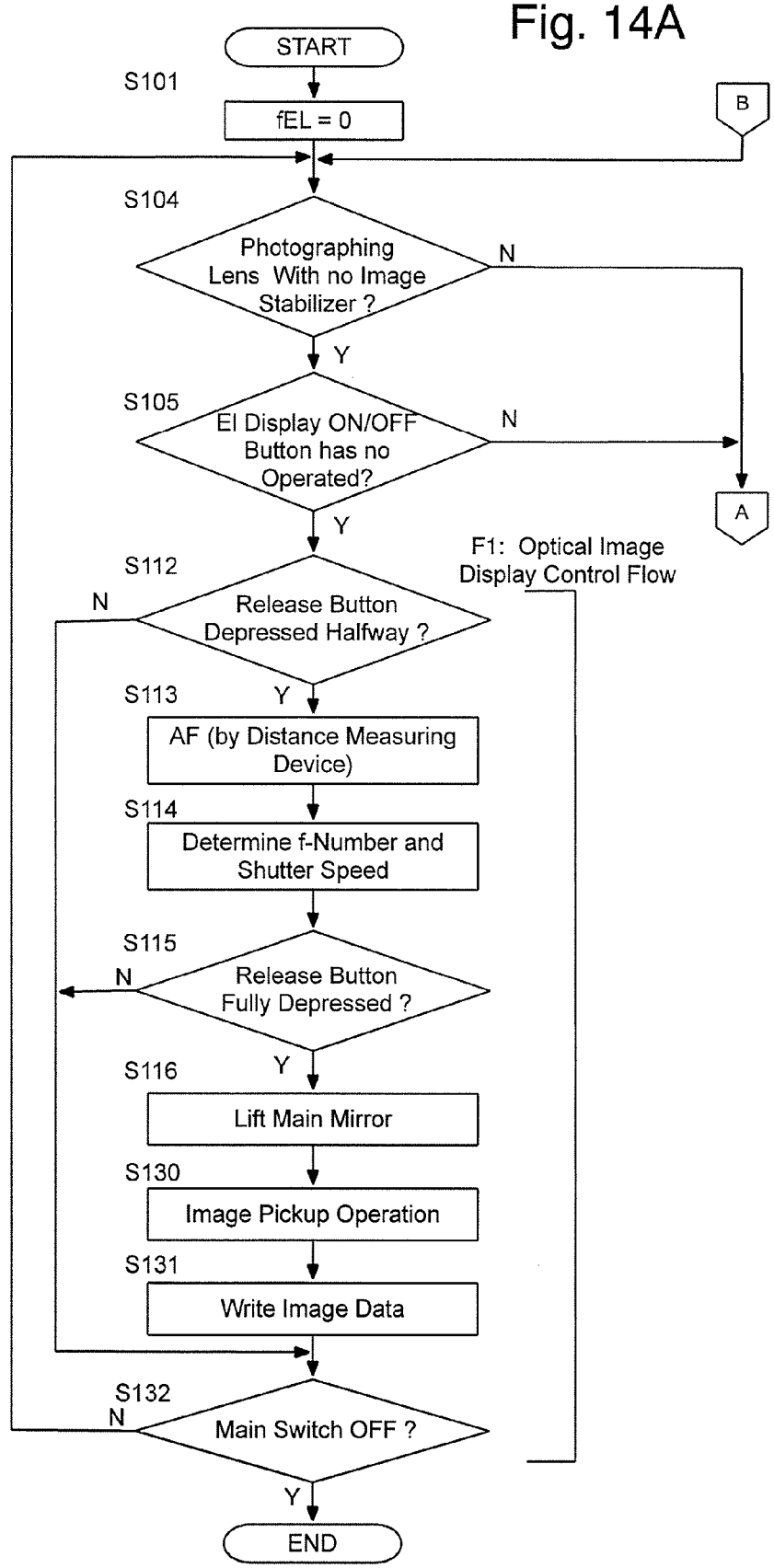
FIGS. 14A and 15B show a flow chart showing operations of a photographing process performed in the SLR digital camera shown in FIGS. 1 and 2.
Figure 14B:
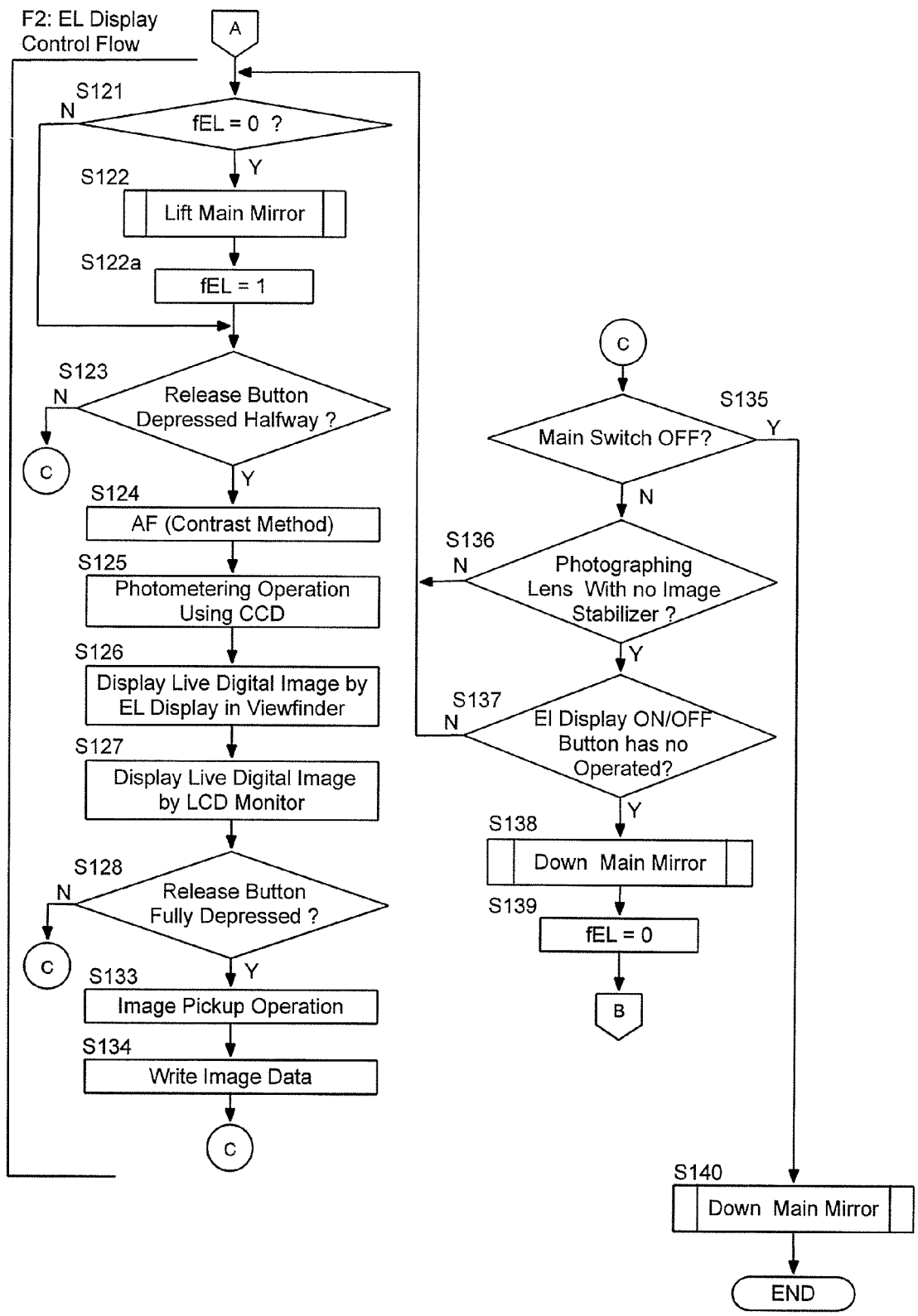

Note that control proceeds to the EL display control flow "F2" unconditionally if it is determined at step S104 in the flow chart shown in FIG. 14A that the photographing lens 2 is of a type having an image stabilizing capability. Since photographing lenses having an image stabilizing capability are configured so as to counteract vibrations of an object image to prevent image shake from occurring, an optical image of an object which is formed on the focusing screen 25 via the photographing lens 2 slightly vibrates on the focusing screen 25 and such vibrations may cause the photographer to get finder-view motion sickness if the photographing lens 2 is of a type having an image stabilizing capability and if the photographer takes pictures while observing the optical object image on the focusing screen 25 through the viewfinder during the control by the optical image display control flow "F1". To prevent this problem from occurring, if the photographing lens 2 is of a type having an image stabilizing capability, making control proceed to the EL display control flow F2 makes it possible to prevent the photographer from getting finder-view motion sickness even if an object image is formed on the focusing screen 25 because this object image is a stabilized live digital image obtained via the image pickup device.

As described above, in the above illustrated embodiment of the SLR digital camera, the viewfinder does not have to be provided with any switching mechanism such as shown in the aforementioned first publication (Japanese unexamined patent publication H10-294888) for switching between an optical image and a live digital image since the EL display 27 that is an extremely-thin display is formed integral with the focusing screen 25 so that an object image captured by the image pickup device 14 is displayed on the focusing screen 25 by the EL display 27 to be viewed through the viewfinder. Moreover, in the above illustrated embodiment of the SLR digital camera, the light shield screen drive mechanism 60 is provided so as to be associated with the mirror drive mechanism 50 so that the light shield screen drive mechanism 60 operates integrally with the mirror drive mechanism 50; accordingly, a complicated structure of the light shield screen drive mechanism 60 is avoided.

Simultaneously with an optical image of an object which is formed on the focusing screen 25 via the photographing lens 2 viewed through the viewfinder, it is possible to make the EL display 27 display photographic information such as an f-number and a shutter speed on the focusing screen 25 within an area thereof which does not interfere with the aforementioned optical image even when the optical image display control flow F1 is executed.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A single-lens-reflex digital camera in which an optical image of an object that is to be photographed via a photographing lens is reflected by a main mirror to be formed on a focusing screen so that said optical image is viewed through a viewfinder while said main mirror is retracted from an optical path of said photographing lens to capture an image of said object by an image pickup device, wherein said single-lens-reflex digital camera comprises:

an electroluminescent display provided on said focusing screen, wherein said electroluminescent display displays at least said object image captured by said image pickup device, and wherein said single-lens-reflex digital camera is configured to allow said object image displayed by said electroluminescent display and said optical image formed on said focusing screen to be viewed through said viewfinder.

2. The single-lens-reflex digital camera according to claim 1, wherein said electroluminescent display is formed integrally with said focusing screen.

3. The single-lens-reflex digital camera according to claim 2, wherein said electroluminescent display displays said object image captured by said image pickup device and various information, when said main mirror is retracted from said optical path of said photographing lens, and wherein said electroluminescent display only displays said various information when said main mirror lies on said optical path of said photographing lens.

4. The single-lens-reflex digital camera according to claim 2, further comprising a light shield screen which selectively covers and uncovers a surface of said focusing screen which is adjacent to said main mirror.

5. The single-lens-reflex digital camera according to claim 4, further comprising a mirror drive mechanism which drives said main mirror, and a light shield screen drive mechanism which retracts said light shield screen from a position thereof which covers said surface of said focusing screen,
    wherein said mirror drive mechanism and said light shield screen drive mechanism are integrated with each other.

6. The single-lens-reflex digital camera according to claim 3, wherein said main mirror is retracted from said optical path of said photographing lens in the case where said photographing lens has an image stabilizing capability.

7. The single-lens-reflex digital camera according to claim 1, wherein said single-lens-reflex digital camera is configured to allow said object image displayed by said electroluminescent display and said optical image formed on said focusing screen to be selectively viewed through said viewfinder.

8. The single-lens-reflex digital camera according to claim 1, wherein said electroluminescent display is positioned on one side of said focusing screen from said main mirror.

9. The single-lens-reflex digital camera according to claim 2, further comprising a light shield screen which is selectively inserted into and retracted from a space between said focusing screen and said main mirror when said main mirror is in a retracted position in which said main mirror is positioned out of said optical path of said photographing lens.

10. A single-lens-reflex digital camera comprising:
    a quick-return mirror;
    a focusing screen, positioned above said quick-return mirror, wherein light of an object which is passed through a photographing optical system and reflected by said quick-return mirror to be formed as an optical image on said focusing screen is viewed through a viewfinder optical system, and wherein, upon a shutter release, said quick-return mirror is retracted from an optical path of said photographing lens to allow said object light that is passed through said photographing optical system to be incident on an image pickup device so that said image pickup device picks up a digital image of said object; and
    an electroluminescent display which displays said digital image on said focusing screen at least when said quick-return mirror is retracted from said optical path.

* * * * *